United States Patent [19]

Smith

[11] Patent Number: 6,021,559
[45] Date of Patent: Feb. 8, 2000

[54] METHODS OF MAKING A CUBE CORNER ARTICLE MASTER MOLD

[75] Inventor: Kenneth L. Smith, White Bear Lake, Minn.

[73] Assignee: 3M Innovative Properties Company, St. Paul, Minn.

[21] Appl. No.: 08/742,640

[22] Filed: Nov. 1, 1996

[51] Int. Cl.[7] .................................................. B23P 13/04
[52] U.S. Cl. ........................ 29/557; 29/527.4; 359/530; 409/131
[58] Field of Search ................................... 29/527.3, 557, 29/558, 527.4; 359/529, 530, 546; 409/131, 132; 264/219

[56] References Cited

U.S. PATENT DOCUMENTS

| | | |
|---|---|---|
| 835,648 | 11/1906 | Straubel . |
| 1,591,572 | 7/1926 | Stimson . |
| 2,027,441 | 1/1936 | Landis .......................................... 41/34 |
| 2,310,790 | 2/1943 | Jungersen ................................... 88/105 |
| 2,380,447 | 7/1945 | Jungersen ..................................... 88/78 |
| 2,407,680 | 9/1946 | Palmquist et al. ........................... 88/82 |
| 3,190,178 | 6/1965 | McKenzie ..................................... 88/82 |
| 3,417,959 | 12/1968 | Schultz .................................... 249/117 |
| 3,684,348 | 8/1972 | Rowland ................................. 350/103 |
| 3,689,346 | 9/1972 | Rowland ................................. 156/245 |

(List continued on next page.)

FOREIGN PATENT DOCUMENTS

| | | |
|---|---|---|
| 0 269 329 A2 | 6/1988 | European Pat. Off. ........ G02B 5/122 |
| 9217179 | 4/1993 | Germany ....................... G02B 5/124 |
| 42 36 799 A1 | 5/1994 | Germany ....................... G02B 5/124 |
| 423464 | 2/1935 | United Kingdom . |
| 441319 | 1/1936 | United Kingdom . |
| WO 95/11465 | 4/1995 | WIPO . |

OTHER PUBLICATIONS

Woltman et al., "Sign Luminance as a Methodology for Matching Driver Needs, Roadway Variables, and Signing Materials," Transportation Research Record 1213, pp. 21–26.

Eckhardt, "Simple Model of Corner Reflector Phenomena," Applied Optics, vol. 10, No. 7, pp. 1559–1566 (Jul. 1971).

Hecht, "The Electromagnetic Approach," Optics, 2$^{nd}$ Ed., pp. 99–108.

*Primary Examiner*—David P. Bryant
*Attorney, Agent, or Firm*—Jed W. Caven; Robert H. Jordan; Stephen C. Jensen

[57] ABSTRACT

A master mold suitable for use in the manufacture of retroreflective sheeting is disclosed. The master mold comprises an array of cube corner elements formed by two intersecting groove sets. The cube corner elements comprise a tetragonal base, three tetragonal optical faces that mutually intersect at a point to define a cube corner apex, and two non-optical faces. Also disclosed is a method for making a master mold suitable in the manufacture of retroreflective sheeting is disclosed. A first groove set including a plurality of parallel grooves is formed in the working surface of a suitable substrate. Each groove in the first groove set forms a first optical surface and a second non-optical surface. Adjacent grooves in the first groove set are separated by a distance sufficient to define therebetween a structure defined by a first optical surface on one side, a top surface, and a first non-optical surface opposite the first optical surface. A second groove set including a plurality of parallel grooves is then formed in the substrate. Each groove in the second groove set forms a second optical surface and a second non-optical surface. The second groove intersects the first groove set at an intersection angle such that the first optical surface intersects the second optical surface to define an orthogonal dihedral angle between the two surfaces. Formation of the second groove set yields a plurality of structures, each of which includes two mutually perpendicular optical surfaces, a top surface, and two non-optical surfaces. A third optical surface is formed from the top surface of each structure such that the third optical surface defines an orthogonal dihedral angle between the first optical surface and the second optical surface, thereby forming a cube corner element.

21 Claims, 6 Drawing Sheets

U.S. PATENT DOCUMENTS

| | | | |
|---|---|---|---|
| 3,712,706 | 1/1973 | Stamm | 350/103 |
| 3,810,804 | 5/1974 | Rowland | 156/245 |
| 3,811,983 | 5/1974 | Rowland | 156/245 |
| 3,812,706 | 5/1974 | Higges et al. | 73/59 |
| 3,873,184 | 3/1975 | Heenan | 350/103 |
| 3,922,065 | 11/1975 | Schultz | 350/103 |
| 3,924,928 | 12/1975 | Trimble | 350/99 |
| 3,924,929 | 12/1975 | Holmen et al. | 350/103 |
| 3,926,402 | 12/1975 | Heenan | 249/117 |
| 4,025,159 | 5/1977 | McGrath | 350/105 |
| 4,066,236 | 1/1978 | Lindner | 249/160 |
| 4,066,331 | 1/1978 | Lindner | 350/103 |
| 4,149,304 | 4/1979 | Brynjegard | 29/148.4 D |
| 4,202,600 | 5/1980 | Burke et al. | 350/103 |
| 4,208,090 | 6/1980 | Heenan | 350/61 |
| 4,243,618 | 1/1981 | Van Arnam | 264/1 |
| 4,332,437 | 6/1982 | Searight et al. | 359/531 |
| 4,349,598 | 9/1982 | White | 428/161 |
| 4,478,769 | 10/1984 | Pricone et al. | 264/1.6 |
| 4,498,733 | 2/1985 | Flanagan | 350/102 |
| 4,576,850 | 3/1986 | Martens | 428/156 |
| 4,582,885 | 4/1986 | Barber | 528/28 |
| 4,588,258 | 5/1986 | Hoopman | 350/103 |
| 4,618,518 | 10/1986 | Pricone et al. | 428/40 |
| 4,668,558 | 5/1987 | Barber | 428/156 |
| 4,703,999 | 11/1987 | Benson | 359/529 |
| 4,712,867 | 12/1987 | Malek | 350/13 |
| 4,726,706 | 2/1988 | Attar | 404/14 |
| 4,775,219 | 10/1988 | Appeldorn et al. | 350/103 |
| 4,801,193 | 1/1989 | Martin | 350/103 |
| 4,895,428 | 1/1990 | Nelson et al. | 350/103 |
| 4,938,563 | 7/1990 | Nelson et al. | 350/103 |
| 4,952,023 | 8/1990 | Bradshaw et al. | 359/529 |
| 5,122,902 | 6/1992 | Benson | 359/529 |
| 5,138,488 | 8/1992 | Szczech | 359/529 |
| 5,156,863 | 10/1992 | Pricone et al. | 425/363 |
| 5,171,624 | 12/1992 | Walter | 428/156 |
| 5,175,030 | 12/1992 | Lu et al. | 428/30 |
| 5,183,597 | 2/1993 | Lu | 264/1.4 |
| 5,237,449 | 8/1993 | Nelson et al. | 359/532 |
| 5,272,562 | 12/1993 | Coderre | 359/529 |
| 5,450,235 | 9/1995 | Smith et al. | 359/529 |
| 5,491,586 | 2/1996 | Phillips | 359/530 |
| 5,557,836 | 9/1996 | Smith et al. | 29/557 X |
| 5,564,870 | 10/1996 | Benson et al. | 409/131 |
| 5,565,151 | 10/1996 | Nilsen | 264/1.1 |
| 5,585,164 | 12/1996 | Smith et al. | 359/530 X |
| 5,734,501 | 3/1998 | Smith | 359/530 |

METHODS OF MAKING A CUBE CORNER ARTICLE MASTER MOLD

FIELD OF THE INVENTION

The present invention relates to cube corner retroreflective materials. In particular, the present invention relates to a cube corner article master mold suitable for use in making retroreflective cube corner sheeting adapted to retroreflect light incident on the sheeting at relatively high angles of incidence and to methods for making the same.

BACKGROUND

Retroreflective materials have the property of redirecting light incident on the material back towards its originating source. This advantageous property has led to the widespread use of retroreflective sheeting on a variety of articles. Very often the retroreflective sheeting are used on flat inflexible articles, for example, road signs and barricades; however, situations frequently arise which require the sheeting to be used on irregular or flexible surfaces. For example, a retroreflective sheeting may be adhered to the side of a truck trailer, which requires the sheeting to pass over corrugations and protruding rivets, or the sheeting may be adhered to a flexible substrate such as a road worker's safety vest or other such safety garment. In situations where the underlying surface is irregular or flexible, the retroreflective sheeting desirably possesses the ability to conform to the underlying substrate without sacrificing retroreflective performance.

There are two common types of retroreflective sheeting: microsphere-based sheeting and cube corner sheeting. Microsphere-based sheeting, sometimes referred to as "beaded" sheeting, is well known in the art and employs a multitude of microspheres, typically at least partially embedded in a binder layer and having associated specular or diffuse reflecting materials (e.g., pigment particles, metal flakes or vapor coats, etc.) to retroreflect incident light. Illustrative examples of such retroreflectors are disclosed in U.S. Pat. No. 3,190,178 (McKenzie), U.S. Pat. No. 4,025,159 (McGrath), and U.S. Pat. No. 5,066,098 (Kult).

Basic cube corner retroreflective sheeting is well-known to those of ordinary skill in the retroreflective arts. The sheeting comprises a substantially planar base surface and a structured surface comprising a plurality of cube corner elements opposite the base surface. Each cube-corner element comprises three mutually substantially perpendicular optical faces that intersect at a single reference point, or apex. Light incident on the planar base surface of the sheeting is refracted at the base surface of the sheeting, transmitted through the sheeting, reflected from each of the of the three perpendicular cube-corner optical faces, and redirected toward the light source. The symmetry axis, also called the optical axis, is the axis that extends through the cube corner apex and forms an equal angle with the three optical surfaces of the cube corner element. Cube corner elements typically exhibit the highest optical efficiency in response to light incident on the base of the element roughly along the optical axis. The amount of light retroreflected by a cube corner retroreflector drops as the incidence angle deviates significantly from the optical axis.

Manufacturers of retroreflective sheeting design retroreflective sheeting to exhibit its peak performance in response to light incident on the sheeting at a specific angle of incidence. The term 'entrance angle' is used to denote the angle of incidence, measured from an axis normal to the base surface of the sheeting, of light incident on the sheeting. See, e.g. ASTM Designation: E 808-93b, Standard Practice for Describing Retroreflection. Retroreflective sheeting for signing applications is typically designed to exhibit its optimal optical efficiency at relatively low entrance angles (e.g. approximately normal to the base surface of the sheeting). See, e.g. U.S. Pat. No. 4,588,258 to Hoopman. Other applications such as, for example, pavement marking or barrier marking applications, require retroreflective sheeting designed to exhibit its maximum optical efficiency at relatively high entrance angles. For example, U.S. Pat. No. 4,349,598 to White ('598 patent) discloses a retroreflective sheeting design wherein the cube corner elements comprise two mutually perpendicular rectangular faces disposed at 45 degrees to the cube corner sheeting base and two parallel triangular faces perpendicular to the rectangular faces to form two optically opposing cube corner elements. U.S. Pat. No. 4,895,428 to Nelson, et al. ('428 patent) and U.S. Pat. No. 4,938,563 to Nelson, et al. ('563 patent) disclose a retroreflective sheeting wherein the cube corner elements comprise two nearly perpendicular tetragonal faces and a triangular face nearly perpendicular to the tetragonal faces to form a cube corner. The cube corner elements further include a non-perpendicular triangular face.

The manufacture of retroreflective cube corner element arrays is typically accomplished using molds made by different techniques, including those the techniques known as pin bundling and direct machining. Molds manufactured using pin bundling are made by assembling together individual pins which each have an end portion shaped with features of a cube corner retroreflective element. U.S. Pat. No. 3,632,695 (Howell) and U.S. Pat. No. 3,926,402 (Heenan et al.) disclose illustrative examples of pin bundling. The direct machining technique, also known generally as ruling, comprises cutting away portions of a substrate to create a pattern of grooves that intersect to form structures including cube corner elements. The grooved substrate is typically used as a master mold from which a series of impressions, i.e., replicas, may be formed. In some instances, the master itself may be useful as a retroreflective article. More commonly, however retroreflective sheeting or retroreflective articles are formed in a polymeric substrate using the master mold or using replicas of the master mold.

Direct machining techniques are a useful method for manufacturing master molds for small microcube arrays. Small microcube arrays are particularly beneficial for producing thin retroreflective sheeting that has improved flexibility. Microcube arrays are also more conducive to continuous manufacturing processes. The process of manufacturing large arrays of cube corners is also relatively easier using direct machining methods rather than pin bundling or other techniques. An illustrative example of direct machining is disclosed in U.S. Pat. No. 4,588,258 (Hoopman).

Master molds suitable for use in forming cube corner sheeting in accordance with the '598 patent, the '428 patent, and the '563 patent may be formed using direct machining techniques as described above. However, the cube corner geometries disclosed in the these patents require two different machining tools to produce a master mold. This reduces the efficiency of the master mold manufacturing process. Additionally, master molds manufactured according to these patents comprise surfaces that extend substantially perpendicular to the base surface of the master mold. Such perpendicular surfaces can be detrimental to the process of producing exact replicas of the master mold.

SUMMARY OF THE INVENTION

The present invention provides a master mold suitable for use in manufacturing retroreflective articles including retroreflective sheeting and methods for making the same. Advantageously, master molds according to the present invention may be formed from a solid, or integral, substrate using known direct machining techniques. Further, methods of the present invention permit the manufacture of master molds suitable for forming retroreflective sheeting adapted to retroreflect high incidence angle light using a single cutting tool. These features reduce the time and expense involved in manufacturing articles in accordance with the invention.

Briefly, according to the method a machinable substrate suitable for use as a master mold is provided. A first groove set comprising at least two, and preferably a plurality, of parallel grooves is formed in the working surface of the substrate. Each groove in the first groove set defines a first optical surface on one side of the groove and a first non-optical surface on the opposing side of the groove. The first optical surface preferably is disposed at an angle between 0 and 20 degrees from a vector perpendicular to the base plane of the substrate. A second groove set comprising at least two, and preferably a plurality, of parallel grooves is formed in the substrate such that the second groove set intersects the first groove set. Preferably, each groove in the second groove set defines a second optical surface on one side and a second non-optical surface on the opposing side of the groove. The second optical surface also preferably is disposed at an angle between 0 and 20 degrees from a vector perpendicular to the base plane of the substrate.

In accordance with the present invention, the second groove set intersects the first groove set at an intersection angle, $\beta$, such that the optical surface of each groove in the second groove set intersects the optical surface of each groove in the first groove set to define an orthogonal dihedral angle between intersecting optical surfaces. Thereby, the optical surfaces of intersecting grooves form two of the three mutually perpendicular optical faces of a cube corner element.

The third mutually perpendicular optical face is formed from the working surface of the substrate. According to one embodiment of the invention, the first and second optical surfaces are substantially perpendicular to the base of the substrate and the top surface is parallel to the base. According to other embodiments of the invention, the first and second optical surfaces are disposed at angles between 70 and 90 degrees relative to the base surface and the top surface is disposed at an oblique angle to the base surface.

In a preferred embodiment of the invention, the groove sets are formed in the substrate using precision machining techniques such as by using diamond machining tools. The distance between adjacent grooves in a groove set preferably varies between about 10 micrometers to about 700 micrometers. The depth of the grooves preferably measures between about 10 micrometers and 700 micrometers.

A master mold manufactured according to the method of the present invention thus includes substrate having a base surface and a structured surface which comprises a positive copy of a cube corner element array. A negative copy of the structured surface may be produced using, for example, conventional electroforming processes. The negative copy may then be used as a mold for forming retroreflective cube corner articles, either in a continuous sheet form or in discrete pieces.

These figures which are idealized, are not to scale and are intended to be merely illustrative and non-limiting.

DETAILED DESCRIPTION OF ILLUSTRATIVE EMBODIMENTS

In the following detailed description of illustrative embodiments, reference is made to the accompanying drawings which form a part hereof, and in which is shown by way of illustration specific embodiments of the invention. It is to be understood that other embodiments may be utilized and structural changes may be made without departing from the scope of the present invention.

The present invention provides molds suitable for forming retroreflective articles and methods for forming the same. More particularly, the present invention provides master molds suitable for use in forming retroreflective sheeting adapted to retroreflect light incident on the sheeting at relatively high entrance angles. Examples of such sheeting are disclosed in further detail in U.S. Pat. No. 5,734,501 (Smith) entitled "HIGHLY CANTED RETROREFLECTIVE CUBE CORNER ARTICLE", filed concurrently with the present application, which is incorporated herein by reference.

Figure 1:
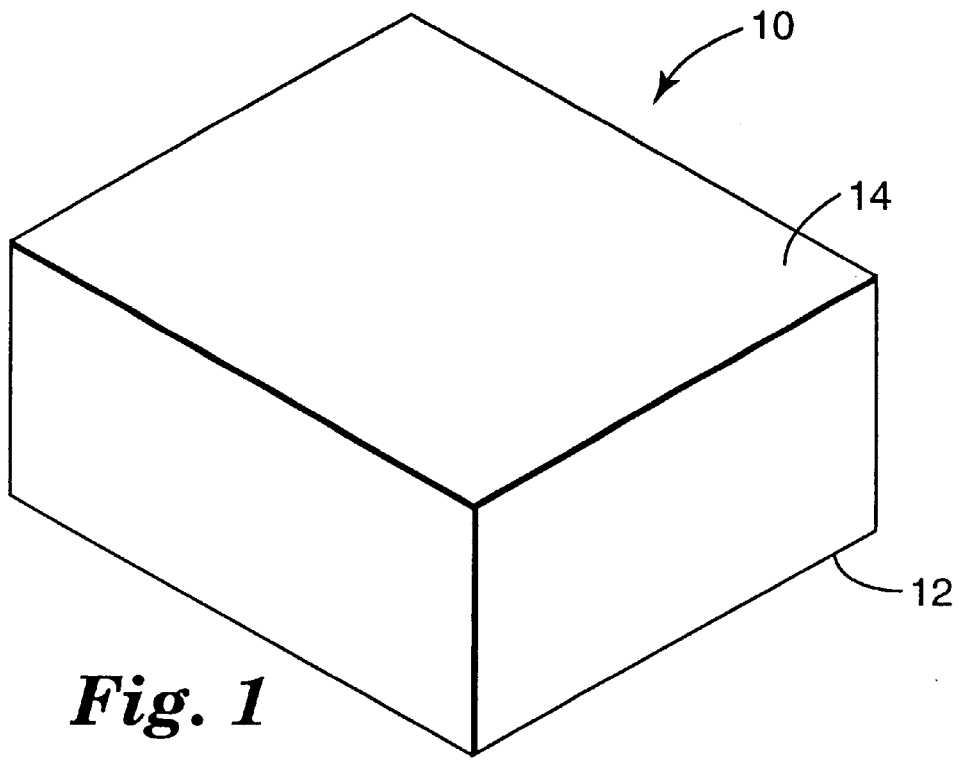
FIG. 1 is a perspective view of a substrate suitable for use in accordance with the present invention.
Figure 2:
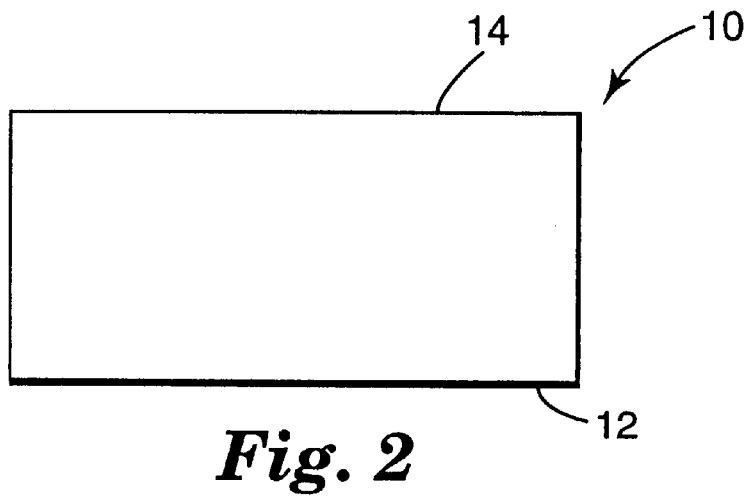
FIG. 2 is a side view of the substrate depicted in FIG. 1.
Figure 10:
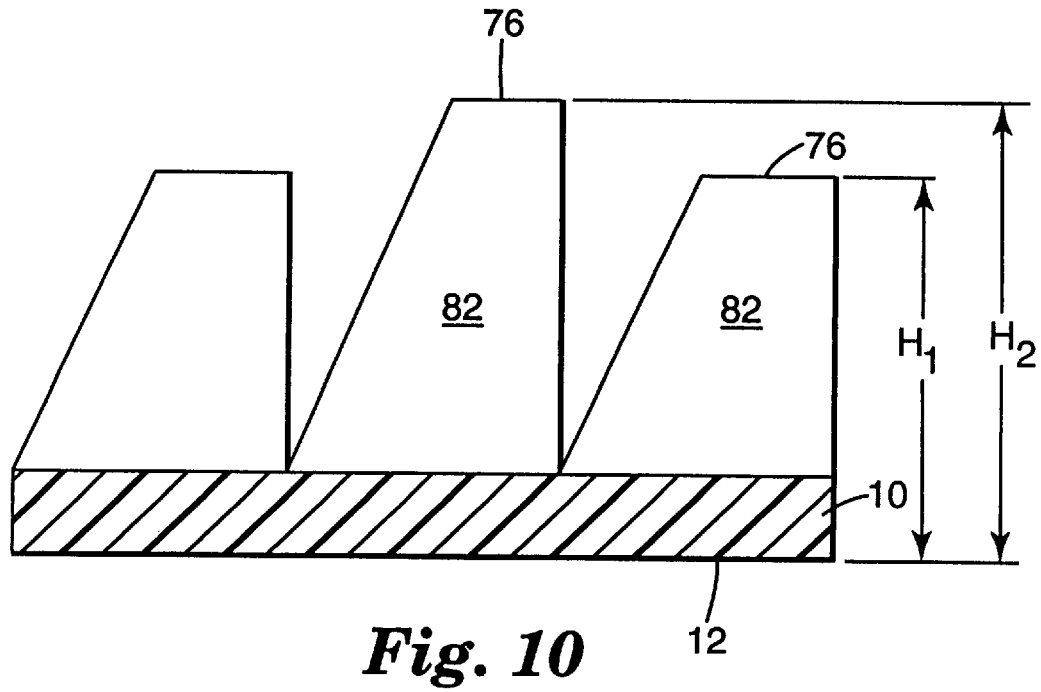
FIG. 10 is a cross-sectional view, taken through plane 10—10, of the master mold depicted in FIG. 9.
Figure 11:
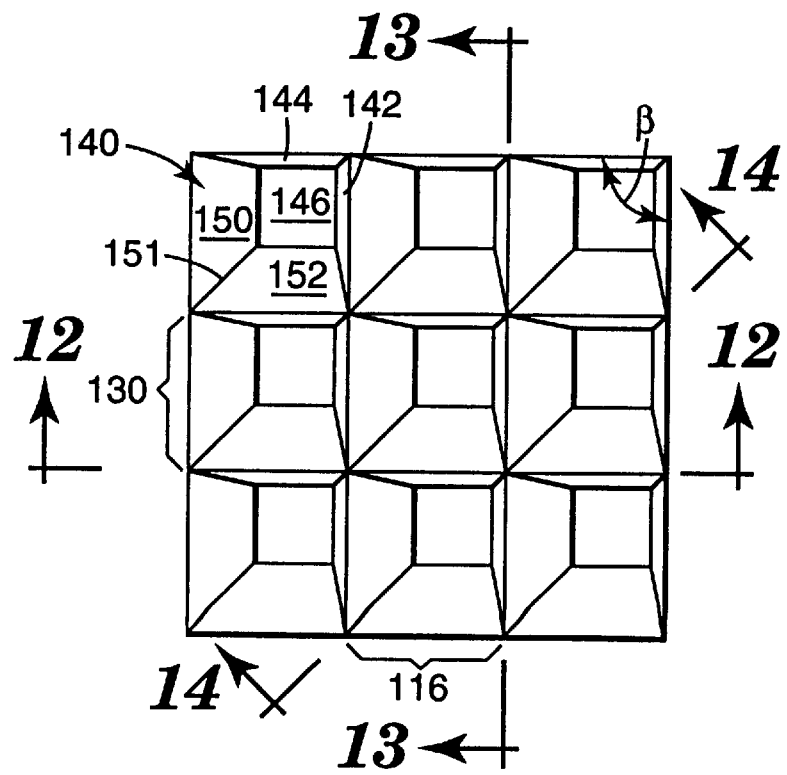
FIG. 11 is a plan view of an alternate embodiment of a a master mold in accordance with the present invention.
Figure 12:
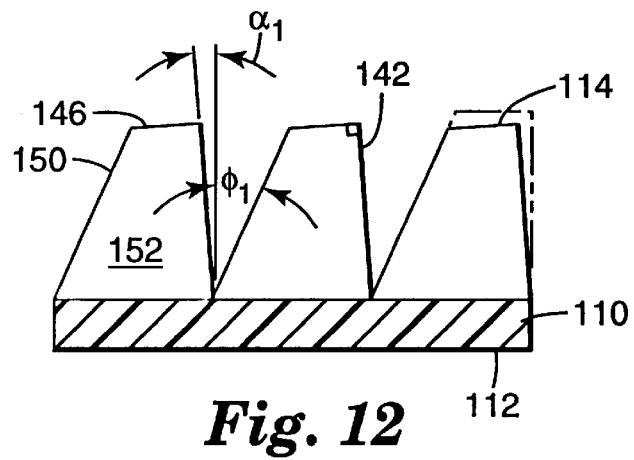
FIG. 12 is a cross-sectional view, taken through plane 12—12, of the substrate depicted in FIG. 11.

One exemplary master mold in accordance with the present invention, and an illustrative method for manufacturing the same, will be described with reference to FIGS. 1–8. Referring to FIGS. 1–2 there is illustrated a portion of a substrate 10 suitable for forming a master mold for making retroreflective articles. Substrate 10 comprises a base surface 12 and a working surface 14 opposite base surface 12. Substrate 10 is preferably a unitary, (e.g. integral) substrate, however it will be appreciated by one of ordinary skill in the art of making retroreflective cube-corner molds that substrate 10 could be formed as an assembly of pins secured by a suitable fixture. The thickness of substrate 10 (measured from base surface 12 to working surface 14) is not critical to the present invention, however, it is desirable that the thickness of substrate 10 measure at least twice the depth of the grooves to be formed in substrate 10. Additionally, while substrate 10 is depicted in FIG. 10 having substantially planar surfaces, it will be appreciated that substrate 10 could be formed on a curved surface such as, for example, the surface of a cylinder.

Substrate 10 is preferably formed from a material suitable for use in high precision machining operations. The material should machine cleanly with minimal burr formation, should exhibit low ductility and low graininess, and should maintain dimensional accuracy after groove formation. A variety of materials such as machinable plastics or metals may be utilized. Suitable plastics comprise thermoplastic or thermoset materials such as acrylics. Suitable metals include aluminum, brass, nickel, and copper.

Initial machining steps will be illustrated with reference to FIGS. 3–4. According to one method of the invention, a first groove set 16 is formed in the working surface of substrate 10. Preferably, first groove set 16 is formed using a precision machining tool such as a diamond machining tool. In the embodiment depicted in FIGS. 3–4, first groove set 16 is formed using a cutting tool having an included angle that is asymmetric about an axis perpendicular to base surface 12 of substrate 10, the included angle measuring approximately 25.36 degrees. However, it will be appreciated that the present invention contemplates the use of a wide variety of cutting tool and workpiece geometries. It will also be appreciated that the present invention is not limited to precision machining fabrication techniques. Other fabrication techniques known to be suitable for forming optical quality surfaces are contemplated by the present invention. Alternate fabrication techniques include, by way of example, ruling, milling, fly-cutting, and grinding techniques may also be useful in the present invention.

First groove set 16 includes at least two, and preferably a plurality of substantially identical, parallel grooves 18 extending through the working surface 14 of substrate 10. As used herein, the term 'groove set' shall refer to all parallel grooves on working surface 14 of substrate 10. Referring to FIG. 4, each groove 18 in first groove set 16 preferably defines an optical surface 20 on one side of the groove and a non-optical surface 22 on the opposite side of the groove. Optical surface 20 and non-optical surface 22 intersect at a groove base 21. In the embodiment depicted in FIGS. 3–4, optical surface 20 is substantially perpendicular to base surface 12 of substrate 10 and non-optical surface 22 is disposed at a first relief angle, $\phi_1$ equal to 25.36 degrees with respect to an axis perpendicular to base surface 12. Each groove base 21 is preferably disposed at the same depth in substrate 10. FIG. 4 shows a substrate having three grooves formed therein. In practice, a typical substrate may measure approximately 10 cm in width and may include hundreds, or even thousands, of grooves formed therein.

As used herein, the term "optical surface" shall refer to a surface which, in the final mold configuration, forms a reflective face of a cube corner element. As discussed above, a cube corner element is defined by the intersection of three substantially mutually perpendicular optical surfaces that mutually intersect at a common point (e.g. the cube corner apex). Optical surfaces should be substantially optically smooth, which, for the purposes of this disclosure, shall mean that an optical surface reflects light incident on the surface with minimal scattering or diffusion. As used herein, the term "non-optical surface" shall refer to a surface which does not form a reflective face of a cube corner element. Many cube corner element array designs do not utilize non-optical surfaces (See e.g. U.S. Pat. No. 4,588,258). However, non-optical surfaces are a necessary element of some cube corner array designs adapted to retroreflect high entrance angle light. (See e.g. U.S. Pat. No. 4,895,428).

The term "relief angle" shall refer to the angle between the plane in which a surface is disposed and a normal vector to base surface 12 of substrate 10. Surfaces disposed in a plane perpendicular to base surface 12, such as the optical surfaces 20 depicted in FIGS. 3–4, form a relief angle of 0 degrees. By contrast, non-optical surfaces 22 form a relief angle with a vector perpendicular to base surface 12. Although the optical surfaces 20 depicted in FIGS. 3–4 do not incorporate a non-zero relief angle, it may be preferable to provide optical surfaces 20 with a non-zero relief angle in some circumstances, as discussed below.

Figure 3:
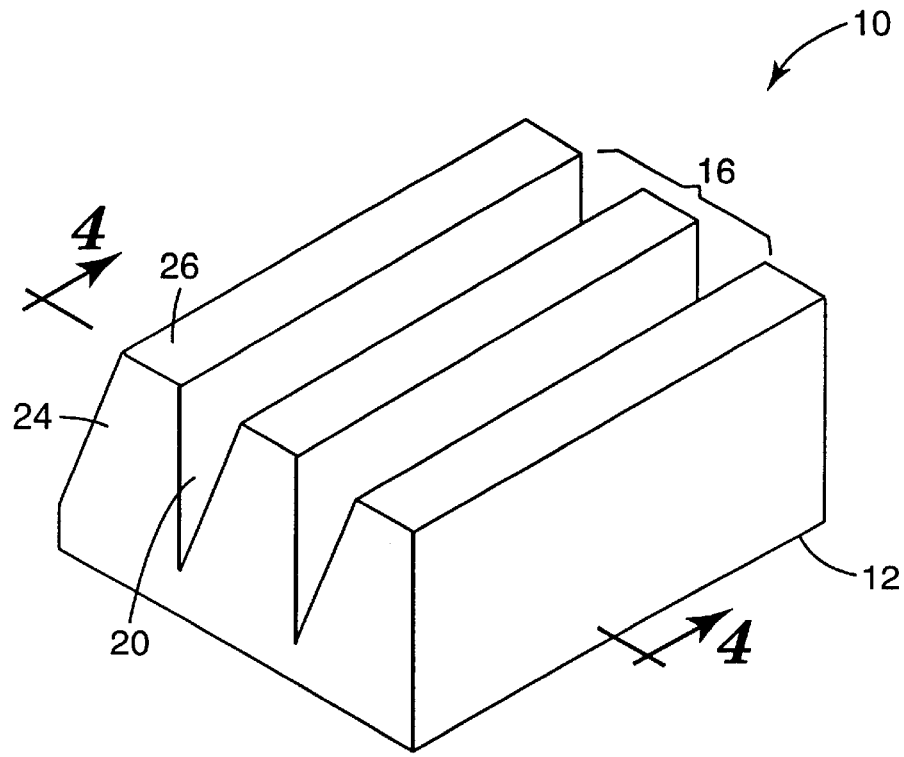
FIG. 3 is a perspective view of the substrate depicted in FIG. 1 after a first machining operation.
Figure 4:
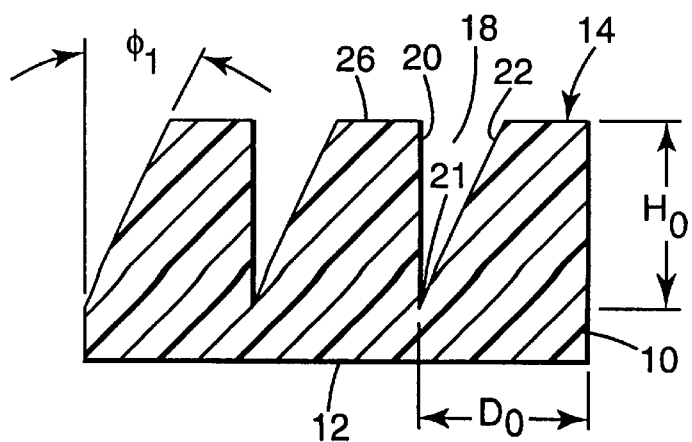
FIG. 4 is a cross-sectional view, taken through plane 4—4, of the substrate depicted in FIG. 3.

After the step of machining first groove set 16 into the working surface 14 of substrate 10 is completed, working surface 14 appears as illustrated in FIGS. 3–4. Working surface 14 comprises a first groove set 16 that includes a series of parallel channels, or grooves 18. The grooves define a corresponding series of structures 24, defined by an optical surface 20, a top surface 26, and a non-optical surface 22. Adjacent grooves in first groove set 16 are separated by a distance $D_0$. In theory, there is no upper limit to the distance $D_0$, however, in practice the upper limit of the distance $D_0$ is related to the thickness of the sheeting material. Present precision machining techniques enable the manufacture of grooves separated by a distance $D_0$ as small as 0.010 millimeters. A preferred range for the separation distance $D_0$ extends between 0.026 millimeters and 0.260 millimeters. This distance accommodates a flexible retroreflective sheeting product within conventional machining tolerances. The distance $D_0$ may be constant, such that the grooves are evenly spaced, or distance $D_0$ may vary. Further, groove base 21 is preferably disposed at a depth approximately equal to the distance $D_0$ between adjacent grooves.

Figure 7:
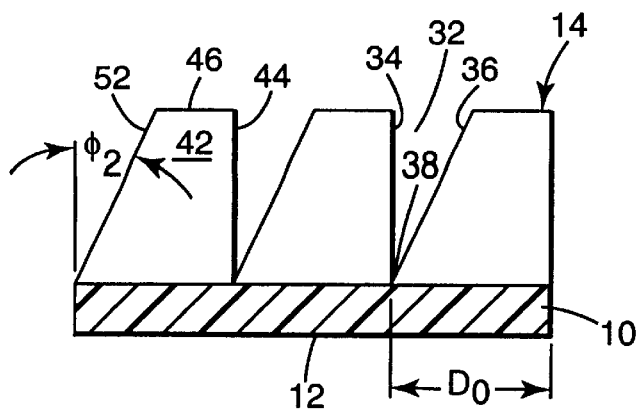
FIG. 7 is a cross-sectional view, taken through plane 7—7, of the substrate depicted in FIG. 5.

FIGS. 5–8 are schematic illustrations of the mold after a second machining operation in a fabrication technique in accordance with the present invention. A second groove set 30 is formed in working surface 14 of substrate 10. Second groove set 30 includes at least two, and preferably a plurality, of parallel grooves extending through the working surface 14 of substrate 10. Preferably, each groove 32 in second groove set 30 defines an optical surface 34 on one side of the groove and a non-optical surface 36 on the opposite side of the groove that intersect at a groove base 38 (FIG. 7). As discussed above, one advantage of the present invention is that second groove set 30 may be formed using the same cutting tool used in forming first groove set 16. Thus, optical surface 34 is substantially perpendicular to base surface 12 of substrate 10 and non-optical surface 36 is disposed at a relief angle $\phi_2$ equal to 25.36 degrees relative to base surface 12.

Importantly, second groove set 30 is formed such that optical surfaces 34 of second groove set 30 intersect optical surfaces 20 formed by first groove set 16 to define an orthogonal dihedral angle between the two surfaces. In the final mold configuration, these two surfaces form two of the three cube corner element optical faces. Provided optical surfaces 20 and 34 are substantially perpendicular to base surface 12, second groove set 30 is formed at a 90° intersection angle ($\beta$) to first groove set 16.

Figure 5:
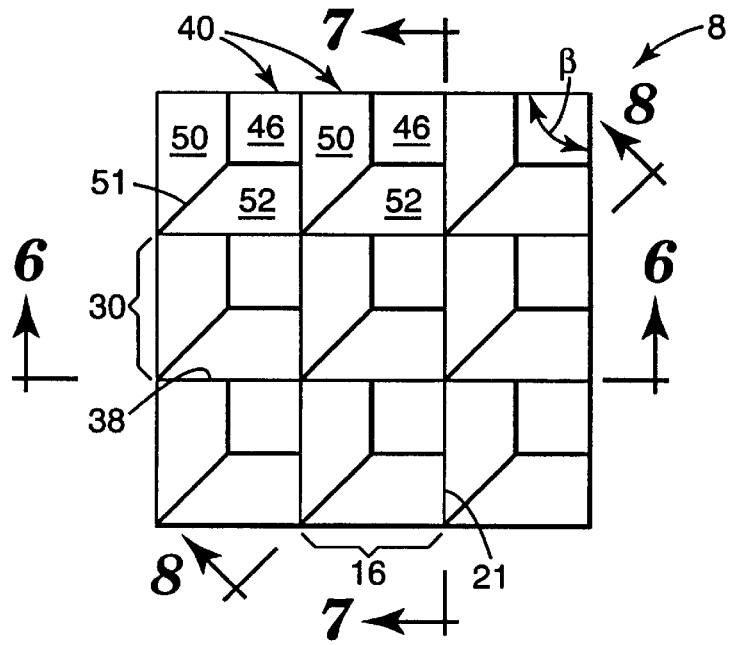
FIG. 5 is a top plan view of the substrate after a second machining operation.
Figure 6:
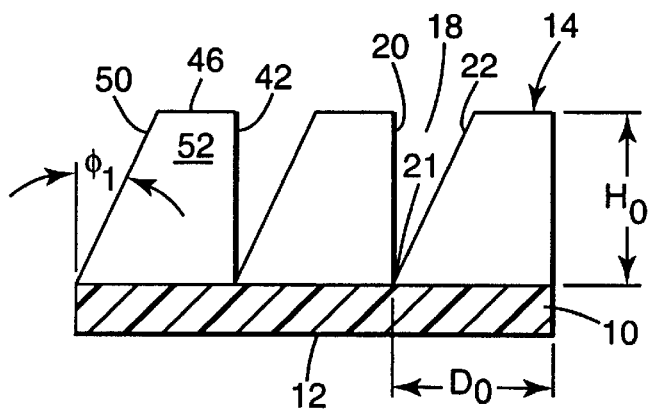
FIG. 6 is a cross-sectional view, taken through plane 6—6, of the substrate depicted in FIG. 5.

Formation of second groove set 30 yields a structured surface that comprises an array of cube corner elements 40 (FIG. 5). Each cube corner element 40 includes a first tetragonal optical face 42 (FIG. 7) corresponding to a portion of optical surface 20 and disposed substantially perpendicular to base surface 12, a second tetragonal optical face 44 (FIG. 7) corresponding to a portion of optical surface 34 and also disposed substantially perpendicular to base surface 12 and to first tetragonal face 42, and a third tetragonal optical face 46 corresponding to a portion of working surface 14 and disposed parallel to base surface 12 and substantially perpendicular to first optical face 42 and second optical face 44. Additionally, each cube corner element 40 also includes a first non-optical face 50 (FIG. 5) corresponding to a portion of non-optical surface 22 and a second non-optical surface 52 (FIG. 5, FIG. 6) corresponding to a portion of non-optical surface 36 that intersect along an edge 51.

The three mutually perpendicular optical faces 42, 44, 46 intersect at an apex 54 (FIG. 8) to define a cube corner element 40. The symmetry axis 60 of each cube corner element 40 lies in a plane disposed at approximately 45° to each groove set. Additionally, the symmetry axis of each cube corner element is disposed at approximately 35.26° to the base surface 12 of substrate 10. Additionally, in each cube corner element 40, the plane that includes a normal vector to base surface 12 and the symmetry axis 60 intersects groove base 21 and groove base 38 at 45° angles. It will be understood that cube corner elements 40 may incorporate minor deviations from orthogonality as disclosed in U.S. Pat. No. 4,775,219.

Figure 8:
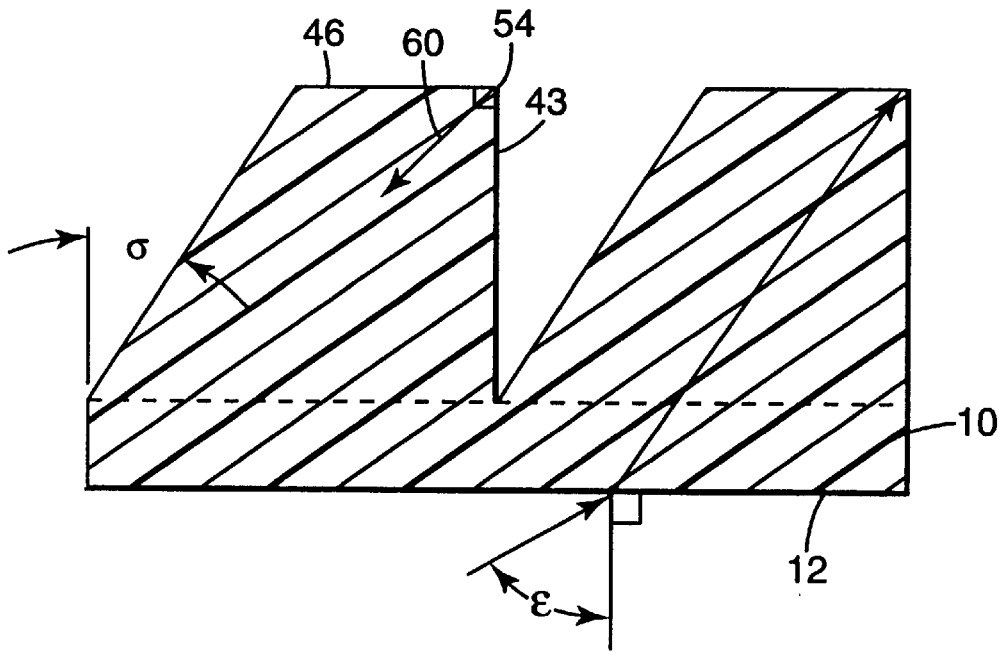
FIG. 8 is a cross-sectional view, taken through plane 8—8, of the substrate depicted in FIG. 5.

In the embodiment depicted in FIGS. 5–8, first non-optical surface 50 forms a first relief angle $\phi_1$ of 25.36 degrees and second non-optical surface 52 forms a second relief angle $\phi_2$ of 25.36 degrees. Relief angles $\phi_1$ and $\phi_2$ are the same in order to increase manufacturing efficiency by using only one machine tool configuration. However, it will be appreciated that these angles may differ from one another. First non-optical surface 50 and second non-optical surface 52 intersect along an edge 51. Edge 51 is disposed in a plane that is normal to base surface 12 and that forms an angle of approximately 45° with grooves in the first groove set 16 and grooves in the second groove set 30. Edge 51 forms an angle, $\sigma$, that measures approximately 35.26° relative to a normal axis to base surface 12 (FIG. 8).

As used herein, the term "relief angle" shall refer to the angle between the plane in which a surface of a cube corner element 40 is disposed and a normal vector to base surface 12 of substrate 10. Surfaces disposed in a plane perpendicular to base surface 12, such as the optical surfaces 44, 46 depicted in FIGS. 1–4 form a relief angle of 0 degrees. By contrast, non-optical surfaces 50, 52 form a relief angles, $\phi_1$ and $\phi_2$, respectively, that each measure approximately 25.36 degrees. Although the values of relief angles $\phi_1$ and $\phi_2$ are not critical to the present invention, manufacturing considerations and principles of geometric optics may be employed to establish preferred ranges for these relief angles.

Surfaces that extend perpendicular to base surface 12 of substrate 10 can be detrimental to the process of manufacturing retroreflective sheeting. In particular, surfaces perpendicular to base surface 12 may concentrate stress during the molding process. A The stress may physically deform the cube corner elements, thereby causing a corresponding optical distortion. Additionally, surfaces perpendicular to base surface 12 increase the difficulty of removing replicas of structured surfaces 14. Thus, from a manufacturing perspective, it is desirable to form surfaces 50, 52 with non-zero relief angles $\phi_1$ and $\phi_2$, respectively, to inhibit stress concentration during the process of manufacturing retroreflective sheeting.

However, optics considerations place an upper limit on a preferred range for relief angles $\phi_1$ and $\phi_2$. In particular, edge 51 is preferably disposed at an angle $\sigma$ such that a light ray incident on base surface 12 at a predetermined entrance angle $\epsilon$ in a plane substantially parallel with edge 51 is refracted at the surface of substrate 10 and propagates through substrate 10 at an angle equal to the angle $\sigma$. Employing principles of geometric optics, the angle $\sigma$ may be derived using the equation:

$$\sigma = \sin^{-1}(\sin(E)/n)$$

where n is the refractive index of the substrate material and $\epsilon$ is the incidence angle (e.g. the entrance angle) of light incident on the base surface 12 of the sheeting. Relief angles $\phi_1$ and $\phi_2$ may then be calculated to yield an edge 51 disposed at angle $\sigma$ using the equation:

$$\phi_1 = \phi_2 = \cos^{-1}\sqrt{\frac{\cos\sigma}{\sin\beta}}$$

By way of example, assuming the mold is used to form a retroreflective sheeting from a material having an index of refraction of 1.5 and designed for a limiting light ray incident on base surface 12 at an incidence angle $\epsilon$ of 60°, angle $\sigma$=35.26° and angles $\phi_1$ and $\phi_2$=25.36°. One of ordinary skill in the retroreflective arts will recognize that the preferred measurement of angles $\phi_1$ and $\phi_2$ is a function of the incidence angle for which the sheeting is designed and the refractive index of the material(s) from which sheeting is manufactured. In general, a preferred range for relief angles $\phi_1$ and $\phi_2$ is between 5° and 45°. A more preferred range is between 20° anand 30°.

Thus, according to one embodiment of the present invention a master mold suitable for use in forming retroreflective sheeting may be manufactured by machining two groove sets in a suitable substrate. The first groove set 16 preferably includes a plurality of parallel grooves 18, each of which defines an optical surface 20 disposed in a plane that extends perpendicular to the base surface 12 of substrate 10 and a non-optical surface 22 disposed in a plane that defines a relief angle $\phi_1$ of 25.36° with a plane perpendicular to the base surface 12 of substrate 10. The second groove set 30 preferably includes a plurality of parallel grooves 32, each of which defines an optical surface 34 disposed in a plane that extends perpendicular to the base surface 12 of the substrate and a non-optical surface 36 disposed in a plane that defines a relief angle $\phi_2$ of 25.36° with a plane perpendicular to the base surface 12 of substrate 10. Advantageously, first groove set 16 and second groove set 30 may be formed with an identical machining tool.

Figure 9:
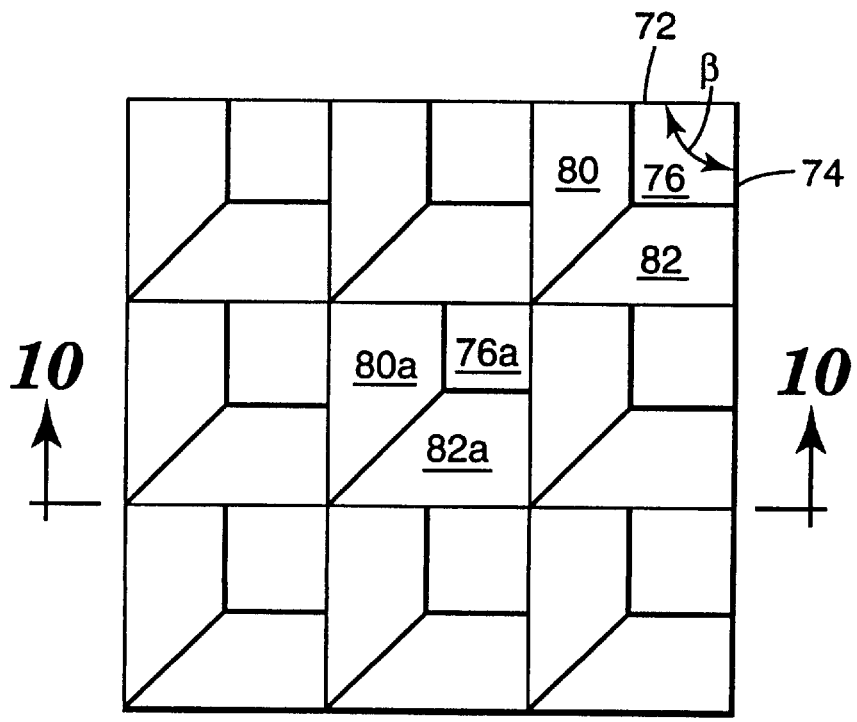
FIG. 9 is a plan view of an alternate embodiment of a master mold in accordance with the present invention.

An alternate embodiment of a mold in accordance with the present invention, depicted in FIGS. 9–10, provides a master mold having a structured surface including cube corner elements disposed at different heights above a common reference plane. A mold in accordance with the embodiment depicted in FIGS. 9–10 may be manufactured by first performing the steps illustrated in FIGS. 1–8 and then performing a subsequent planing operation to reduce the height of some cube corner elements. Alternatively, the planing operation may be performed prior to the steps illustrated in FIGS. 1–8. Retroreflective articles formed as a replica of a mold in accordance with FIGS. 9–10 find particular utility in supporting a backing layer. The backing layer is supported by the higher cube corner elements, reducing the likelihood of optical coupling between the backing layer and the remaining cube corner elements.

According to another embodiment of the present invention the distance between adjacent grooves in a groove set may be varied to form differently sized cube corner elements. Preferably, adjacent grooves are separated by a distance between 10 microns and 700 microns and even more preferably by a distance between 26 microns and 260 microns. Variable groove spacing may be used either in combination with multiple cube heights or separately therefrom.

Figure 13:
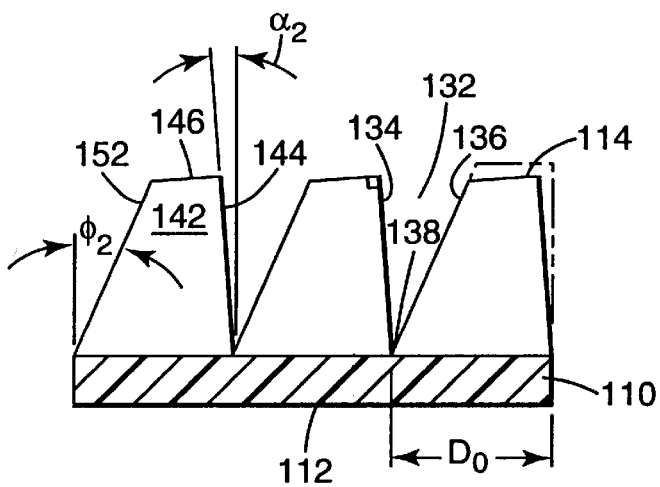
FIG. 13 is a cross-sectional view, taken through plane 13—13, of the substrate depicted in FIG. 11.
Figure 14:
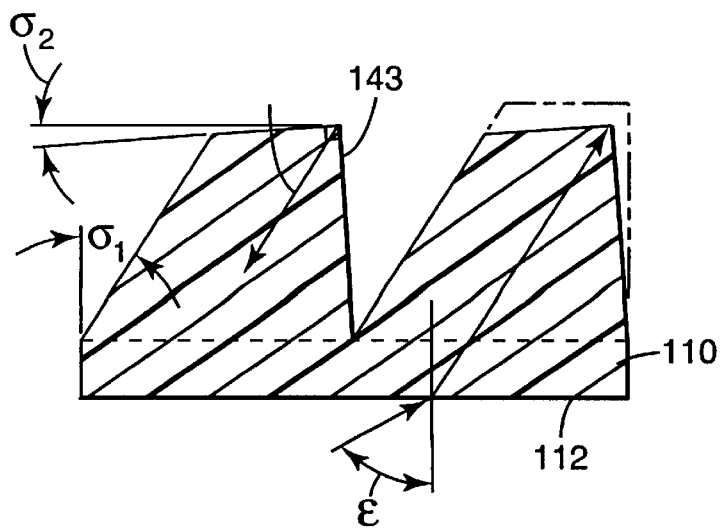
FIG. 14 is a cross-sectional view, taken through plane 14—14, of the substrate depicted in FIG. 11.

FIGS. 11–14 depict another embodiment of a mold manufactured in accordance with aspects of the present invention. The mold depicted in FIGS. 11–14 comprises a substrate 110 having a base surface 112 and a structured surface including an array of cube corner elements 140. Each cube corner element 140 comprises a first tetragonal optical surface 142 disposed at a relief angle $\alpha_1$ to normal vector to base surface 112 (FIG. 12) and a second tetragonal optical surface 144 also disposed at a relief angle $\alpha_2$ to a normal vector to base surface 112 (FIG. 13). A third tetragonal optical surface 146 is disposed at an oblique angle relative to base surface 112. Each cube corner element 140 further includes a first tetragonal non-optical surface 150 and a second tetragonal non-optical surface 152 that intersect along an edge 151. A mold in accordance with the embodiment depicted in FIGS. 11–14 finds particular utility in the manufacturing process of forming precise copies of the mold. It has been determined that surfaces that extend perpendicular to base surface are detrimental to the process of producing accurate copies of the structured surface. Providing a relief angle to optical faces 142 and 144 ensures that no portion of structured surface extends perpendicular to base surface 112.

Manufacturing a mold in accordance with FIGS. 11–14 requires only minor modifications to the process described in connection with FIGS. 1–9. A substrate 110 comprising a base surface 112 and a working surface 114 is provided. A first groove set 116 comprising a plurality of parallel grooves is formed in the working surface 114 of substrate 110. A second groove set 130 is then formed in the working surface 114 of substrate 110. As discussed above, second groove set 130 and first groove set 116 must intersect at an intersection angle $\beta$ that results in an orthogonal dihedral angle between the optical surface 120 of first groove set 116 and the optical surface 134 of second groove set 130. The required intersection angle $\beta$ is a function of the relief angles $\alpha_1$ and $\alpha_2$ provided to the optical surfaces of the cube corner elements and must be calculated to ensure that optical surfaces 142, 144 are substantially perpendicular. In an embodiment where $\alpha_1=\alpha_2$, $\beta$ may be calculated from the following formula:

$$\beta = \cos^{-1}(\tan^2(\alpha))$$

Note that for the embodiment depicted in FIGS. 3–8, relief angle, $\alpha_1=\alpha_2=0°$ and intersection angle $\beta=90°$. Preferably, relief angles $\alpha_1$, $\alpha_2$ measure between 0° and 20° and more preferably between 3° and 10°. Accordingly, a preferred range for intersection angle $\beta$ extends from 90° to 82°.

Forming second groove set 130 creates a plurality of structures having a first optical face 142 and a second optical face 144 substantially perpendicular to first optical face 142. However, at this point in the machining process the third optical face 146 of the structures is not perpendicular to the first and second optical faces 142, 144, respectively. Accordingly, a third machining process must be performed to form a third optical face 146 in a plane that is mutually perpendicular to optical faces 142, 144. The angle at which third optical face 146 may be determined as a function of the relief angles, $\alpha_1$ and $\alpha_2$ imparted to optical surfaces 142, 144 and the base angle $\beta$ by the following formula:

$$\sigma_2 = \tan^{-1}\left[\frac{\tan\alpha}{\sin(\beta/2)}\right]$$

Preferably, the machining process which forms third optical face 146 is performed after the formation of first groove set 116 and second groove set 130, however it could be performed prior to forming the groove sets. In a preferred embodiment, third optical faces 146 are formed by machining away a portion of the working surface of the mold after groove sets 116, 130 are formed. Preferably, the machining operation transverses the mold at approximately at a 45° angle to groove sets 116, 130, thereby cutting on the diagonal. One of ordinary skill in the art will recognize that this operation must be performed with precision to avoid damaging the optical surfaces of adjacent cube corner elements. In some embodiment, it may be necessary to adjust the height of the cube corner elements to reduce the likelihood of damaging adjacent cube corner elements.

Master molds manufactured in accordance with principles of the present invention include a positive cube corner array. As such, the array is suitable for use as a master mold to produce molds for manufacturing retroreflective articles. The structured surface of the master mold may be replicated using, for example, conventional electroplating techniques known to those skilled in the art to form a mold having a negative copy of the cube corner array. A retroreflective article may then be manufactured by a conventional molding process.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A method of making a cube corner master mold having cube corner elements bounded by exactly two groove sets, the method comprising:
   providing a machinable substrate, the substrate having a base surface disposed in a base plane and a working surface opposite the base surface;
   forming in the working surface a first groove set comprising at least two parallel grooves, each groove defining first optical surfaces and first non-optical surfaces; and
   forming in the working surface a second groove set comprising at least two parallel grooves, each groove in the second groove set defining second optical surfaces and second non-optical surfaces, such that the second optical surfaces intersect substantially mutually orthogonally with the first optical surfaces and with third optical surfaces, different from the first and second non-optical surfaces, to form the cube corner elements.

2. A method according to claim 1, wherein:
   the step of forming the first groove set comprises machining the working surface with an asymmetric tool.

3. A method according to claim 1, wherein:
   the step of forming the first groove set comprises forming the first optical surfaces at an angle between 0 degrees and 20 degrees from a vector extending normal to the base surface.

4. A method according to claim 1, wherein:

the step of forming the first groove set comprises forming the first non-optical surface at an angle between 5 degrees and 45 degrees from a vector extending normal to the base surface.

5. A method according to claim 1, wherein:

the step of forming the first groove set comprises providing a distance between adjacent grooves in the first groove set between 10 and 700 microns.

6. A method according to claim 1, wherein:

the step of forming the first groove set comprises providing a distance between adjacent grooves in the groove set in a range between 26 and 260 microns.

7. A method according to claim 1, wherein:

the step of forming the first groove set comprises the step of varying the distance between adjacent grooves in the first groove set.

8. A method according to claim 1, wherein:

the step of forming the second groove set comprises machining the working surface with an asymmetric tool.

9. A method according to claim 1, wherein:

the step of forming the second groove set comprises forming the second optical surface at an angle between 0 degrees and 20 degrees from a vector extending normal to the base surface.

10. A method according to claim 1, wherein:

the step of forming the second groove set comprises forming the second non-optical surface at an angle between 5 degrees and 45 degrees from a vector extending normal to the base surface.

11. A method according to claim 1, wherein:

the step of forming the second groove set comprises providing a distance between adjacent grooves in the second groove set between 10 and 700 microns.

12. A method according to claim 1, wherein:

the step of forming the second groove set comprises providing a distance between adjacent groove in the second groove set in a range between 26 and 260 microns.

13. A method according to claim 1, wherein:

the step of forming the second groove set comprises varying the distance between adjacent grooves in the second groove set.

14. A method according to claim 1, wherein: the step of forming the second groove set comprises machining the second groove set at a base angle $\beta$ relative to the first groove set between 82 degrees and 90 degrees.

15. A method according to claim 1, wherein:

the step of forming the second groove set comprises machining the second groove set at a base angle $\beta$ relative to the first groove set between 88 degrees and 90 degrees.

16. A method according to claim 1, wherein: the third optical surfaces comprise portions of the working surface remaining after the two forming steps.

17. A method according to claim 1, futher comprising:

forming the third optical surfaces by machining portions of the working surface to orient the third optical surfaces at oblique angles between 0 degrees and 20 degrees relative to the base surface.

18. A method according to claim 1, further comprising:

forming the third optical surfaces by machining portions of the working surface to orient the third optical surfaces a oblique angles between 3 degrees and 10 degrees relative to the base surface.

19. A method according to claim 1, further including the step of:

forming a replica of the cube corner elements in a material suitable for a use a mold.

20. The method of claim 1, wherein the step of forming the first groove set comprises machining the working surface with a first cutting tool, and the step of forming the second groove set comprises machining the working surface with a second cutting tool substantially the same as the first cutting tool.

21. The method of claim 20, wherein the second cutting tool is the first cutting tool.

* * * * *

UNITED STATES PATENT AND TRADEMARK OFFICE
CERTIFICATE OF CORRECTION

PATENT NO.  : 6,021,559
DATED       : February 8, 2000
INVENTOR(S) : Smith, Kenneth L.

It is certified that error appears in the above-identified patent and that said Letters Patent is hereby corrected as shown below:

Title page,
Item [57], ABSTRACT,
Line 4, delete "comer" and insert -- corner --.

Column 1,
Lines 45 and 52, delete "comer" and insert -- corner --.

Column 2,
Line 14, delete "comer" and insert -- corner --.

Column 7,
Line 4, delete "comer" and insert -- corner --.

Column 8,
Line 28, delete "anand" and insert -- and --.

Signed and Sealed this

Fourth Day of March, 2003

JAMES E. ROGAN
*Director of the United States Patent and Trademark Office*